April 14, 1925.  
C. A. PIPENHAGEN  
1,533,460  
SHUTTER APPARATUS FOR RADIATORS  
Filed March 1, 1920  2 Sheets-Sheet 1
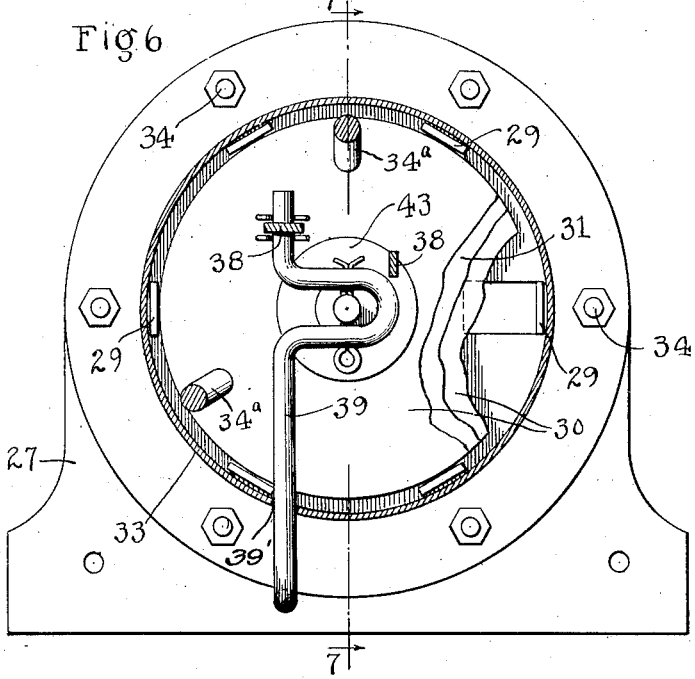
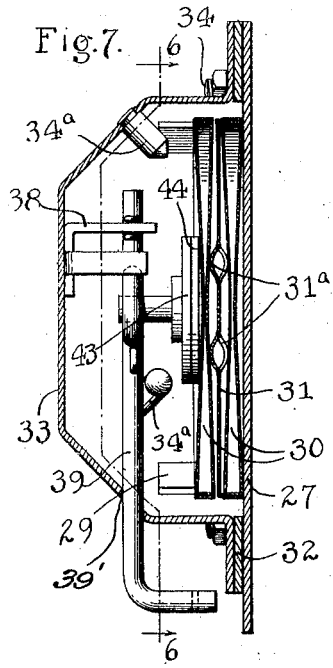
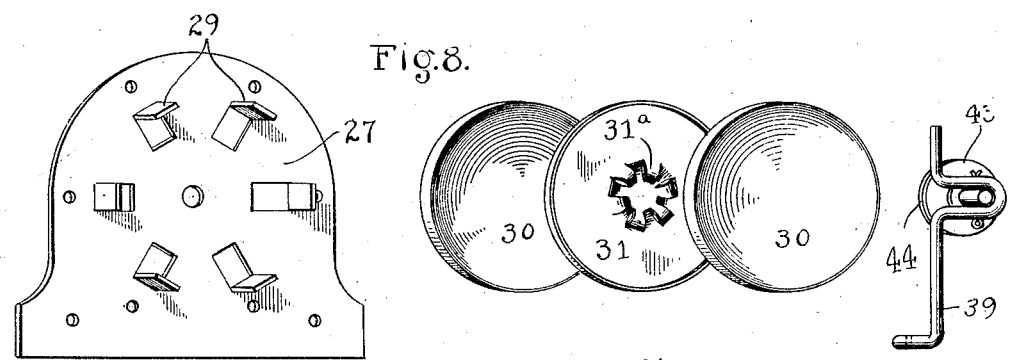
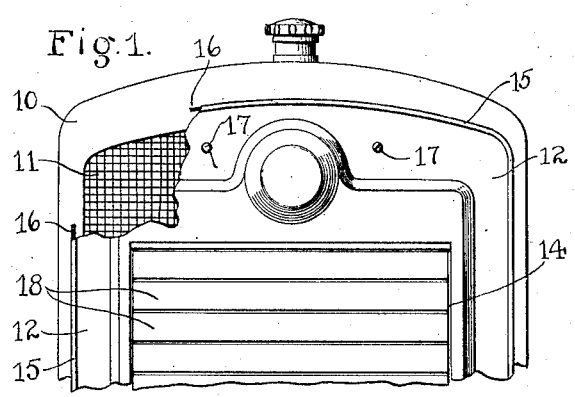
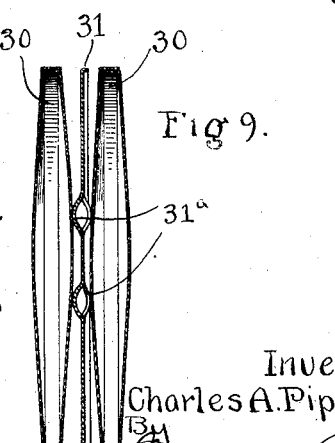
Inventor  
Charles A. Pipenhagen.  
By William Bradbury  
See Attorneys

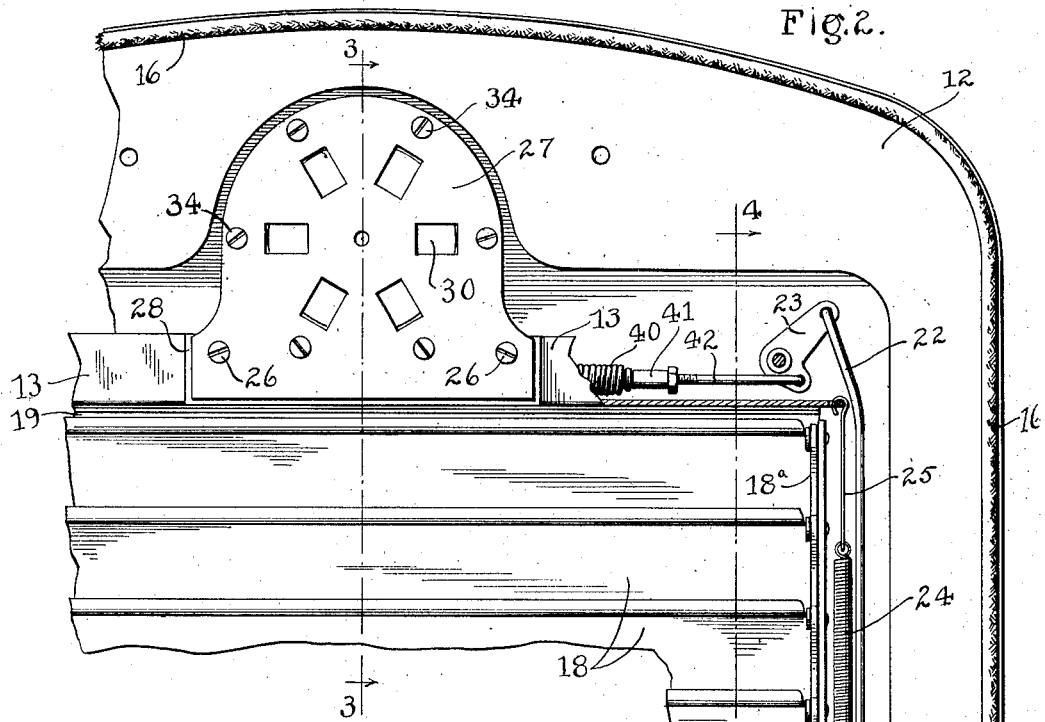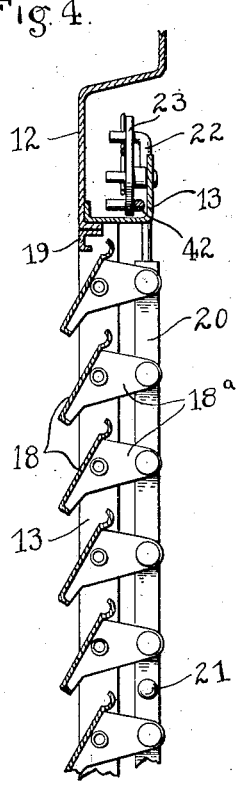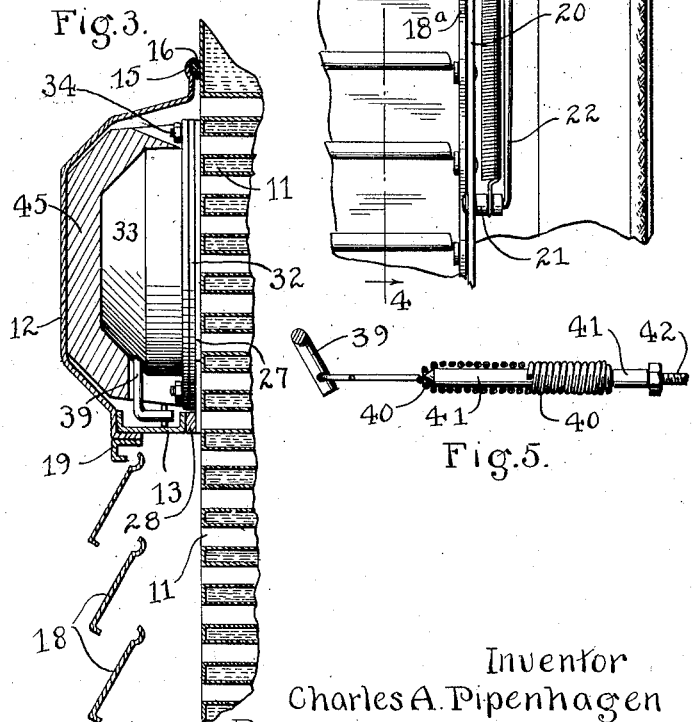

Patented Apr. 14, 1925.

1,533,460

UNITED STATES PATENT OFFICE.

CHARLES A. PIPENHAGEN, OF CHICAGO, ILLINOIS, ASSIGNOR TO PINES MANUFACTURING COMPANY, A CORPORATION OF DELAWARE.

SHUTTER APPARATUS FOR RADIATORS.

Application filed March 1, 1920. Serial No. 362,251.

*To all whom it may concern:*

Be it known that I, CHARLES A. PIPENHAGEN, a citizen of the United States, and resident of Chicago, county of Cook, and State of Illinois, have invented a certain new and useful Improvement in Shutter Apparatus for Radiators, of which the following is a full, clear, concise, and exact description, reference being had to the accompanying drawings, forming a part of this specification.

My invention relates to a shutter apparatus controlled by a thermostat and adapted for use in connection with the radiator of an internal combustion engine, more particularly an automobile engine, for the purpose of regulating the amount of air that may pass through the radiator core in order that the engine cooling system, of which the radiator is a part, may always be kept at the temperature most conducive to efficient engine operation, regardless of weather, the speed of the engine, the travel of the automobile and other variable conditions which ordinarily affect the rates at which the liquid in the cooling system is heated or cooled.

The principal object of the present invention is to provide a novel and improved thermostat device whereby the shutters of an apparatus of the class mentioned may be automatically controlled and operated.

In the accompanying drawings illustrating my invention,

Figure 1 is a fragmentary front elevational view illustrating a shutter apparatus embodying my invention as it is applied to an automobile radiator.

Figure 2 is a fragmentary rear view of the shutter apparatus removed from the radiator.

Figure 3 is a fragmentary sectional view illustrating the relation of the thermostat elements to the radiator core. This view may be regarded as having been taken on the line 3—3 of Figure 2.

Figure 4 is a fragmentary detailed view taken on the line 4—4 of Figure 2.

Figure 5 is a detailed view of the safety spring forming a part of the operating connection between the thermostat and the shutter.

Figure 6 is a sectional view taken on line 6—6 of Figure 7 and illustrating the thermostat housing and the contents thereof.

Figure 7 is a sectional view taken on the line 7—7 of Figure 6.

Figure 8 illustrates the heat conducting plate, the thermowafers, the spacer and the pallet of the thermostat device disassembled, and Figure 9 is an axial sectional view illustrating the thermowafers expanded.

Similar characters of reference refer to similar parts throughout the several views.

Referring first to Figure 1, it will be noted that I have illustrated a conventional form of automobile engine radiator comprising the frame 10 and core 11. For the purpose of the present specification it will be unnecessary to illustrate the manner of mounting the radiator upon the automobile or the manner of its connection with the water jackets of the engine. The shutter apparatus may be considered as consisting of two frames, namely, the main frame 12 in the form of a drawn sheet metal shell and a sub-frame 13 of rectangular shape. The sub-frame is carried by the main frame or shell 12 and serves to support the shutters employed for the purpose of closing the large rectangular opening 14 in the main frame or for restricting the flow of air through said opening to a greater or less extent as may be required for most efficient engine operation.

The main frame or shell 12 is designed to engage the radiator only at the margins of the main frame and even at its margins the main frame is provided with cushioning material which is interposed between the main frame and the radiator frame. As is most clearly shown in Figures 1 and 3, the sheet metal constituting the main frame 12 is provided with a continuous marginal bead 15 which provides a corresponding continuous groove for the reception of cushioning material in the form of a braided cord illustrated at 16. The main frame is held in position solely by a plurality of long slender bolts 17 which pass through the main frame 12 and through the radiator core 11. It should be noted at this point that at its upper central portions, the sheet metal shell constituting the main frame is conformed to provide a receptacle for the thermostat and the heat insulation of the latter.

So far as my present invention is concerned, the specific construction of the sub-frame 13 is not of particular importance. As before stated, it is preferably constructed of channel members and is carried by the main frame 12 and, by the latter, held out of engagement with any portion of the radiator. The specific means for holding the sub-frame in the main frame constitutes no part of my present invention and for that reason I have not deemed it necessary to illustrate or describe such means in the present specification. The specific construction of the sub-frame and the preferred means for securing the same in the main frame is shown and fully described in the co-pending application of James F. Raleigh, Serial No. 362,515, filed of even date herewith, and patented June 12, 1923, No. 1,458,593.

Suitably journaled in the sub-frame 13 is a plurality of shutters 18 which, when in the position shown in Figure 1, entirely close the opening or window 14 of the main frame. The shutters are preferably formed of sheet metal and are so conformed that when in closed position they interlock at their upper and lower margins, this construction being clearly illustrated in Figures 3 and 4.

A desirable, but, of course, not necessary feature of construction is the substantially L-shaped strip 19 which is attached to the edge of that portion of the sheet metal shell which constitutes the upper margin of the window 14, the purpose of the strip 19 being to insure a tight fit between the shell and the top edge of the uppermost shutter when the shutters are in closed position.

Each of the shutters is provided with an arm 18ª pivoted to an operating bar 20 so that all of the shutters will be simultaneously operated when movement is imparted to the operating bar. As is shown in Figure 2, the bar 20 is provided with a hollow stud 21 engaged by the offset lower end of a rod 22, the upper end of which is connected with the long arm of a bell crank lever 23 which is pivoted to the upper channel member of the sub-frame 13, as is most clearly shown in Figure 2. A coil spring 24, having its lower end engaging in an annular groove in the stud 21 normally tends to hold the shutter bar and the shutters in their closed positions. It will thus be seen that the spring 24 opposes movement of the shutters to the open positions illustrated in Figures 3 and 4. The upper end of spring 24 is attached to the lower end of a link 25, the upper end of which is conformed to provide a hook engaging in an aperture conformed in the top channel member of the sub-frame 13.

I shall now describe the several elements of the thermostat and the means for mounting and insulating the same. Centrally disposed with respect to the upper channel member of the sub-frame 13 and retained in position by screws 26 is what I prefer to term a heat conducting plate 27, the same being formed of aluminum or other good heat conducting material. This heat conducting plate is held in contact with the front face of the radiator core and serves as the sole means for conducting heat from the radiator core to the heat responsive elements of the thermostat. Heat insulating material preferably in the form of a wooden strip 28 is interposed between the conducting plate 27 and the sub-frame 13 effectively to insluate the conducting plate from any portion of the framework of the apparatus. Struck from the heat conducting plate 27 is a plurality of forwardly projecting tongues 29, these tongues being disposed in circular arrangement and arranged to embrace the peripheries of the heat responsive elements 30—30. The heat responsive elements consist of hollow metal wafers filled with a volatile fluid such, for instance, as a compound including ether among its constituents. Each of the heat responsive elements consists of two concavo-convex halves provided with co-operating peripheral flanges, these flanges lying one within the other and being soldered or otherwise suitably secured together to form a hollow gas-tight wafer. The heavy convex halves of each wafer are so disposed with respect to each other that when the wafer is not expanded, the wafer has concave faces. However, when the wafer is expanded as shown in Figure 9, the wafer faces are forced outwardly with the result that the outer faces become convex. It will be noted that the axial distance between the wafer faces is much greater when the wafer is expanded as shown in Figure 9 than when the wafer is collapsed as illustrated in Figure 7.

I prefer to employ a pair of wafers 30—30 and to separate the same by means of the sheet metal spacer 31. This spacer is preferably in the form of a disc provided at its periphery with a lateral flange so that the spacer will not present any sharp edge which might cut into or mutilate the aluminum tongues 29 within which the thermo wafers and the spacer are embraced when properly assembled in their operating positions. Near its central portion, the spacer 31 is preferably provided with a plurality of portions 31ª struck from the plane of the spacer. These laterally projecting portions of the spacer are conveniently formed by cutting a multiplicity of radial slits in the metal of the spacer and striking the metal between said slits in opposite directions as is most clearly shown in Figures 8 and 9. It is these laterally projecting portions 31ª of the spacer, half of which engage one of the thermowafers and half of which engage the other, which serve as the means for conducting heat from the wafer which lies against the heat conducting plate to the other wafer. I find it desirable to utilize this form of spacer in order that heat may be conducted from one wafer to the other rather slowly so that the thermostat device will not be too rapid in its operation of the shutters.

Supported by the heat conducting plate 27 but insulated therefrom by an annulus 32 of cardboard or other heat insulating material is a thermostat housing 33, preferably of drawn steel which is secured in position by screws 34. The housing 33 preferably contains some means for preventing the thermowafers and spacer from escaping from the embrace of the lugs 29—29 when the parts are assembled as shown in Figure 7. This means may be in the form of a plurality of studs 34ª which project from the inner inclined surface of the thermostat housing. Secured to the inner side of the front wall of the housing 33 is a small bracket 38 which journals the upper end of a double bell crank lever 39, the lower end of which passes through and is journaled in an aperture 39 in the lower portion of housing 33. The crank portions of the double bell crank lever 39 are disposed substantially 90° apart, the lower crank portion being connected with one end of a spring 40 which is coiled around a rod 41 and has its other end engaging in an annular groove in said rod 41. Rod 41 is adjustably connected with a link 42 which extends to and is pivoted to the short arm of the bell crank lever 23; as is clearly shown in Figure 2. Being comparatively stiff the spring 40 constitutes part of what is normally a practically rigid connection between bell crank lever 23 and the double bell crank lever 39. Spring 40, however, is capable of yielding to prevent disruption of the thermostat wafers 30—30 in case the shutters, through ignorance or otherwise, are forcibly closed when the thermostat wafers are expanded.

The upper crank of the double bell crank 39 has pivoted thereto the stem of a pallet 43, the pallet comprising a facing of cardboard 44 which constitutes heat insulation at this point and also cushions the engagement of the pallet with its adjacent thermowafer 30. It will thus be seen that expansion of the thermowafers results in the operation of the double bell crank 39 and that movement thus imparted to the double bell crank is transmitted through spring 40, rod 41, link 42, bell crank 23, and link 22 to the shutter operating bar 20.

The thermostat housing 33 is thoroughly insulated from the main frame 12 by heat insulation 45 which is preferably, in the form of a comparatively thick wooden cap as shown in Figure 3. It is unnecessary to provide screws or other similar fastening means for retaining the wooden cap in position as the same fits the thermostat housing 33 very snugly and is held against displacement by the dished receptacle portion of the shell or main frame 12 in which it is disposed.

By virtue of the arrangement of parts herein shown and described the thermowafers 30—30 respond only to changes in the temperature of the radiator core as such changes in temperature are communicated to the thermostat wafers by the heat conducting plate 27. This is true because the thermostat housing is thoroughly insulated from the main frame by the wooden cap 45 and from the sub-frame by both the wooden strip 28 and the insulating annulus 32 and because of the fact that the heat conducting plate 27 is also insulated from the sub-frame 13 and is so held that it is prevented from coming in contact with the main frame 12.

I may say that for ordinary requirements, the thermo characteristics of the thermowafers 30—30 may be such that when the temperature of the radiator core exceeds 130° Fahrenheit, the wafers begin appreciably to expand and become fully expanded when the radiator core exceeds a temperature of from 175° to 180° Fahrenheit. As the cells expand and press against the pallet 43, motion is imparted to the double bell crank lever 39 and this motion is transmitted through the connections previously described to open the shutters to a greater or less extent against the action of the coil spring 24. When the cells begin to collapse, due to the cooling of the radiator core, the spring 24 causes the pallet to follow the adjacent face of its cooperating thermowafer cell and the shutters are thereby caused to assume a closed or partially closed position corresponding to the collapsed or partially collapsed condition of the thermowafers.

It will be noted that the thermostat construction herein shown and described is of compact, sturdy, and economical construction and that the arrangement shown and described renders it possible effectively to operate the shutters by means of thermowafer cells which occupy an extremely small amount of space when collapsed and but very little more space when expanded. The specific form of thermowafer herein shown enables me to impart a maximum amount of movement to the pallet 43 for a minimum amount of expansion of the thermowafer cells.

This application is a continuation in part of my copending application S. N. 362,250, filed March 1, 1920.

While I have illustrated but one embodiment of my invention, I do not limit myself to this specific construction but desire to claim all equivalent constructions coming within the terms and spirit of the appended claims.

What I claim is new and desire to secure by Letters Patent of the United States is:

1. A thermostat for a device of the class described comprising a plurality of separate concentrically disposed thermowafer cells and a sheet metal spacing member having a punched projection engaging one of said wafer cells.

2. In a thermostatic device of the class described, a heat conducting plate adapted to lie in contact with the front surface of a radiator, a supporting frame for the heat conducting plate, said heat conducting plate being attached along one of its edges to said frame, a heat conducting receptacle carried by the front face of said plate, a thermowafer in said receptacle, and a follower for said thermo-wafer.

3. A thermostat for a device of the class described comprising contiguous thermo wafer cells, said cells being normally concave and spacers disposed intermediate said cells, said spacers having lateral projections punched out of the body thereof arranged to lie in the cavities in said cells.

4. In a thermostat for a device of the class described, the combination with a pair of normally double concave thermowafer cells, of a sheet metal disc disposed intermediate said cells and having lateral projections punched out of the body thereof to engage in the depressions in said cells.

5. A thermostat for a device of the class described comprising a pair of normally double concave thermowafer cells, a spacer for said cells having lateral projections to engage in the cavities in said cells and a follower engaging one wall of one of said thermowafer cells, said follower comprising a heat insulating portion for preventing conduction of heat therethrough to said thermo-wafer cells.

6. A thermostatic device of the class described comprising a dished housing, a plate closing the open side of the housing, a plurality of lugs struck from said plate and projecting into the housing, said lugs being disposed in circular arrangement, a thermowafer embraced and supported by said lugs, a lever journalled in the housing and a pallet which is mechanically connected with said lever and which constitutes a follower for one face of the thermo-wafer.

7. A thermostatic device of the class described comprising a dished housing, a plate closing the open side of the housing, a plurality of lugs struck from said plate and projecting into the housing, said lugs being disposed in circular arrangement, a thermowafer embraced and supported by said lugs, a lever journalled in the housing, a pallet which is mechanically connected with said lever and which constitutes a follower for one face of the thermo-wafer, and means carried by the housing adapted to prevent said wafer from escaping from the embrace of said lugs.

8. In a thermostatic device of the class described, a heat conducting plate adapted to lie in contact with the front surface of a radiator, a heat conducting wafer receptacle carried by said plate, a thermowafer disposed in said receptacle, and a follower for said thermowafer.

9. A thermostatic device comprising a pair of juxtaposed thermo-wafers, the opposed faces of the adjacent side walls of said wafers being concave at normal temperatures and a heat conducting spacer disc disposed between said concave faces, said spacer disc being independent of said wafers and provided with a laterally projecting flange at its periphery which normally engages the adjacent wall of one of the wafers near the margin thereof, and having a lateral projection punched from the central portion thereof.

10. In a thermostatic device of the class described, a heat conducting plate adapted to lie in contact with the front face of a radiator, a heat conducting wafer support carried on the front face of said plate, a thermowafer freely disposed in said support for expansion and contraction therein, and a follower for said wafer.

11. In a thermostatic device of the class described, a heat conducting plate adapted to lie in contact with the front face of a radiator, a heat conducting wafer support carried by said plate, a thermowafer carried by said support, a housing thermally insulated from said plate, and a crank journaled in said housing and having one end extending therefrom, said crank being operatively connected to said wafer.

12. In a thermostatic device of the class described, a heat conducting plate adapted to lie in contact with the front face of a radiator, a thermowafer, heat conducting wafer supporting means carried by said plate, a housing over the other side of said wafer, a crank journaled in said housing, and a follower engaged by said wafer and operatively connected to said crank.

13. In a thermostat for a device of the class described, the combination with a pair of thermowafer cells having their adjacent sides normally concave, of a spacer disposed intermediate said cells, said spacer having a plurality of substantially radial slits therein adjacent to the center thereof, the material intermediate said slits being alternately disposed laterally beyond the surface of said spacer in opposite directions.

14. A thermostat for a device of the class described comprising a pair of independent thermowafer cells, the adjacent sides of said cells being normally curved from each other, a spacer positioned between said cells, said spacer having lateral projections extending into the cavities in the adjacent faces of said cells, and a follower having a heat insulating face engaging one wall of one of said thermowafer cells.

15. A thermostatic device of the class described comprising a dished housing, a plate closing the open side of said housing, a plurality of lugs struck from said plate and projecting into the housing, a thermowafer embraced and supported by said lugs, and a follower engaging one face of the thermowafer.

16. A thermostatic device of the class described comprising a dished housing, a plate closing one side of said housing, a plurality of lugs extending from said plate into said housing, said lugs being disposed in substantially circular arrangement, a thermowafer embraced and supported by said lugs, and a follower engaging one face of said thermowafer.

17. A thermostatic device of the class described comprising a dished housing, a plate closing one side of the housing, a plurality of lugs extending from said plate into said housing, a thermowafer embraced and supported by said lugs, a lever journaled in the housing, and a pallet which is mechanically connected with said lever and which constitutes a follower for one face of the thermowafer.

18. A thermostatic device comprising a heat conducting plate, wafer supporting and guiding means integral therewith projecting from one side of the plate, a thermowafer embraced and retained in position by said supporting and guiding means, and a follower for the face of the thermowafer which is remote from said plate.

19. A thermostat mechanism for a radiator shutter apparatus comprising a heat conducting plate adapted to lie in contact with the core of a radiator, a plurality of tongues struck from said plate and disposed in circular arrangement, a thermowafer embraced by said tongues, and a pallet constituting a follower for one wall of said thermowafer.

20. A thermostat mechanism for a radiator shutter apparatus comprising a heat conducting plate adapted to lie against the core of a radiator, a thermowafer disposed in contact with said heat conducting plate, said plate provided with portions adapted to embrace said thermowafer, and a follower for one wall of said thermowafer.

21. A thermostat mechanism for a radiator shutter apparatus comprising a heat conducting plate adapted to lie against the core of a radiator, a thermowafer cell disposed in contact with said heat conducting plate, and means integral with said heat conducting plate projecting therefrom and embracing said thermowafer.

22. A thermostat mechanism for a radiator shutter apparatus comprising a pair of thermowafer cells, means disposed in contact with one of said thermowafer cells adapted to conduct heat thereto from a radiator core, and a follower for one wall of the other thermowafer cell.

23. A thermostat mechanism for a shutter apparatus for radiators comprising a heat conducting plate lying immediately adjacent the core of a radiator, a plurality of lugs struck from said plate, and projecting therefrom in circular arrangement, a circular thermowafer cell embraced by said lugs, and a follower for the thermowafer cell.

24. A thermostat mechanism for a radiator shutter apparatus comprising a plurality of concentrically disposed thermowafer cells, heat conducting spacing means therefor, a heat conducting plate adapted to lie against a radiator core and constituting an abutment for one of said thermowafer cells, and a follower for another of said thermowafer cells.

In witness whereof, I hereunto subscribe my name this 23 day of February, 1920.

CHARLES A. PIPENHAGEN.

Witnesses:
ANDREW WINTERCORN,
EDNA V. GUSTAFSON.